Patented Nov. 30, 1926.

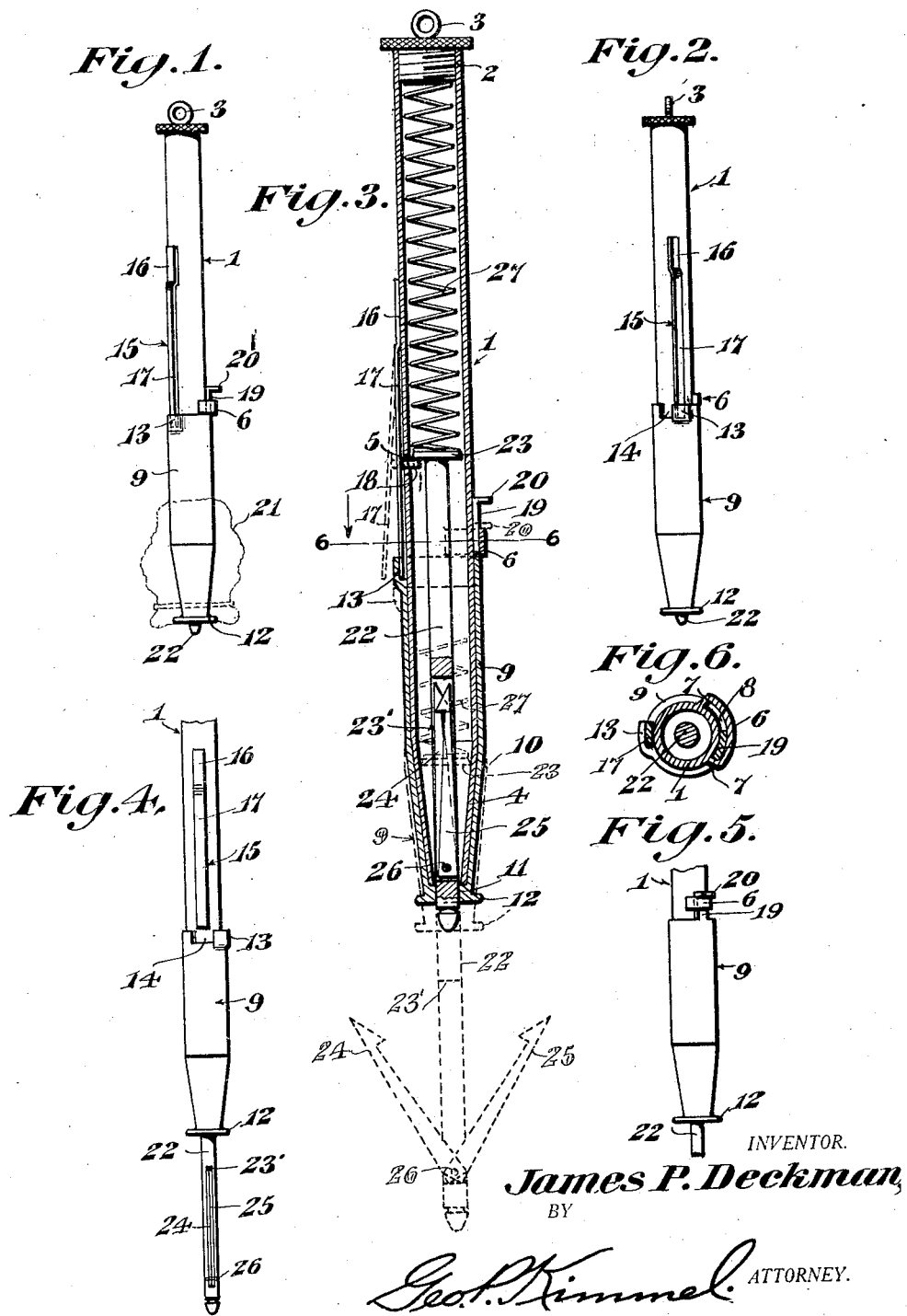

1,609,160

UNITED STATES PATENT OFFICE.

JAMES P. DECKMAN, OF STREET, MARYLAND.

FISHHOOK.

Application filed March 17, 1926. Serial No. 95,297.

This invention relates to fish hooks, of the spring controlled type, and has for its object to provide a fish hook of the class referred to, in a manner as hereinafter set forth, in the form of a plug or wabbler containing spring controlled concealed hooks which are adapted to be released by the fish to engage in its mouth and hold the same until the fish is landed.

A further object of the invention is to provide, in a manner as hereinafter set forth, a fish hook of the class referred to including means disposed to be actuated by a fish closing its mouth thereon for the purpose of releasing a spring controlled carrier to project a plurality of hook elements into the mouth of the fish thereby positively hooking the same and precluding any danger of the fish working free of the hook elements while being removed from the water.

Further objects of the invention are to provide, in a manner as hereinafter set forth, a fish hook of the spring controlled type which is simple in its construction and arrangement, strong, durable, compact, automatic in its action, thoroughly efficient in its use, conveniently arranged in latched position, and comparatively inexpensive to manufacture.

With the foregoing and other objects in view, the invention consists of a novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a side elevation of a fish hook made in accordance with this invention and with the hooks in retracted position.

Figure 2 is a view similar to Figure 1 looking towards the other side thereof.

Figure 3 is an enlarged vertical sectional view of the fish hook and illustrating the hooks in full lines in retracted position and in dotted lines in projected position.

Figure 4 is a fragmentary view in side elevation illustrating the fish hook in projected position and looking towards one side thereof.

Figure 5 is a view similar to Figure 4 looking towards the other side thereof.

Figure 6 is a section on line 6—6 Figure 3.

Referring to the drawings in detail, 1 denotes a wabbler consisting of a tubular member of appropriate length and which further provides a housing for the spring controlled carrier and hook elements to be presently referred to. The tubular member which provides the wabbler 1 has its upper end closed by a removable flanged threaded plug 2 provided with an eye 3 for connection to the line, not shown. The lower terminal portion of the tubular member is tapered as at 4 and the lower end of said tubular member is open. The tubular member immediate its ends and above the tapered terminal portion 4 is provided with an opening 5 for a purpose to be presently referred to. Formed integral with the periphery of the tubular member above and spaced from the slot 5 is a combined guide and arrester which consists of a segmental portion 6 of appropriate length and a pair of inwardly extending end portions 7 which are formed integral with the tubular member 1 and which further spaces the portion 6 from the periphery of said tubular member to form a guide passage 8 and which is clearly shown in Figure 6.

Mounted on the tubular member 1 is a sleeve 9 of appropriate length and which is formed with a tapered lower terminal portion 10 merging into a flanged collar 11. The collar 11 is positioned at the lower end of the sleeve 9, is integral therewith and the flange thereof is indicated at 12. The sleeve 9 is lengthwise and circumferentially shiftable with respect to the tubular member which forms the wabbler 1. The upper end of the sleeve 9 is formed with an offset portion 13 and a notch 14 providing a clearance for a purpose to be presently referred to. The offset portion 13 constitutes means for maintaining a spring controlled latching member 15 in latching position.

The latching member 15 is secured at its upper terminal portion 16 to the periphery of the tubular member 1 and that portion of the member 15 which is not secured to the tubular member 1 is offset as indicated at 17. The latching member 15 is disposed lengthwise with respect to the tubular member and formed intermediate its ends with a right angularly disposed lug 18 adapted to extend through the slot or opening 5 into the tubular member 1 to maintain the carrier and the hook elements in a retracted position. The sleeve 9 at its upper end is formed with a vertically disposed inverted L-shaped arm 19 which extends through the guide opening or passage 8 and has the horizontal leg 20 thereof positioned to engage the top edge of the portion 6 of the combined guide and arrester for limiting the downward movement of the sleeve 9 relative to the wabbler 1. The sleeve 9 not only provides means for maintaining the latching member in latching position, but also constitutes a bait carrier. The position of the bait 21 with respect to the sleeve 9 is indicated in dotted lines in Figure 1, and the lower end of the bait 21 is seated against the flange 12 and the latter prevents the bait from slipping off the sleeve 9 when the bait 21 is positioned thereon.

Arranged within the wabbler 1 and capable of being projected therefrom is a spring controlled carrier consisting of a cylindrical bar 22 provided with a head 23 at its upper end capable of being engaged by the lug 18 for the purpose of maintaining the carrier in a retracted position within the wabbler 1 and such position is shown in Figure 3 of the drawing. The bar 22 between its transverse center and its lower end is formed with a lengthwise extending slot 23′ in which is arranged a pair of oppositely shiftable, gravity movable hook elements 24, 25 which are mounted upon a common pivot 26 therefor at the lower end of the slot 23′. The bar 22 when projected passes through the collar 11 and the hook elements assume the position shown in dotted lines in Figure 3.

Arranged within the wabbler 1 and interposed between the plug 2 and the head 23 of the carrier is a coiled spring 27 which provides means for projecting the carrier when the latter is released. When the carrier is shifted to its retracted position it compresses the spring 27 and the latter is maintained in such position due to the engagement of the lug 18 with the head 23 of the carrier. See Figure 3. The lug 18 is maintained in such position by the offset portion 13 of the sleeve 9. When the sleeve 9 is shifted lengthwise by the fish engaging the bait 21, the offset portion 13 moves off of the lower end of the latching member 15 and the latter springs outwardly carrying the lug 18 therewith, whereby the head 23 of the carrier is released, and the spring 27 will project the carrier to the dotted line position shown in Figure 3 whereby the hook elements will engage in the mouth of the fish and hook the same. The carrier is set in inactive position manually by slightly turning the sleeve 9 until the lower end of the latching member 15 aligns with the notch 14. The carrier is then moved upwardly on the wabbler 1 until the lower end of the latching member 15 seats in the notch 14 and then the sleeve 9 is shifted circumferentially to position the offset portion 13 over the lower end of the latching member 15. The carrier is shifted inwardly within the wabbler 1 prior to the shifting of the sleeve 9 to lock the latching member 15, and when said carrier is shifted inwardly in the wabbler 1 the extent of the shift is such as to provide for the head 23 being positioned above the opening or slot 5, so when the latching member is locked the lug 18 will be positioned in the path of the head 23 and arrest any projecting movement of the carrier. The shifting of the sleeve 9 off of the lower end of the wabbler 1 is arrested by the arm 19 engaging the portion 6 of the combined guide and arrester and the guide passage 8 is of sufficient length to permit of the sleeve 9 being shifted circumferentially on the wabbler 1 to provide for locking the latching member in position to hold the carrier in its retracted position.

Although the device as disclosed, is designed primarily for a fishing hook, yet it is to be understood that it can be used as a trap for animals, and furthermore it is to be understood that a device made in accordance with this invention can be employed for any purposes for which it is found applicable, and therefore it is thought the many advantages of a device, in accordance with this invention, can be readily understood, and although the preferred embodiment of the device is as illustrated and described, yet it is to be understood that changes in the details of construction can be had which will fall within the scope of the invention as claimed.

What I claim is:—

1. A device for the purpose set forth comprising a tubular element, a spring controlled carrier mounted in and projectable through one of the ends of said element and provided with a plurality of pivoted hook members gravity movable in opposite directions to operative position when the carrier is projected, a latching means carried by said element for releasably retaining the carrier in a retracted position, a lengthwise shiftable sleeve mounted on said element and having its upper end engaging said latching means for releasably maintaining it in position to hold the carrier in a retracted position, said sleeve further circumferentially shiftable with respect to said element to provide for the engagement of the sleeve with the latching means to retain it in latching position and shiftable lengthwise of said element to release said latching means, said sleeve having its upper end provided with a notch to form a clearance for the lower end of said latching means when the sleeve is shifted to retain said means in latching position, and means for limiting the shifting movement of the sleeve circumferentially and lengthwise with respect to said element.

2. A device for the purpose set forth comprising a tubular element, a spring controlled carrier projectable through one end of said element and provided with a plurality of pivoted hook elements gravity movable in opposite directions to operative position when the carrier is projected, latching means secured to said element and cooperating with the carrier for normally holding it in a retracted position, and a combined retaining and releasing sleeve for said latching means, said sleeve shiftable circumferentially with respect to said element to retain said latching means in latching position with respect to the carrier and shiftable lengthwise with respect to said element to release the latching means to permit of the projecting of the carrier, and said element and sleeve having coacting means to limit the lengthwise and circumferential shifting of said sleeve.

3. A device for the purpose set forth comprising a tubular element, a spring controlled carrier projectable through the one end of said element and provided with a plurality of pivoted hook elements gravity movable in opposite directions to operative position when the carrier is projected, latching means secured to said element and cooperating with the carrier for normally holding it in a retracted position, a combined retaining and releasing sleeve for said latching means, said sleeve shiftable circumferentially with respect to said element to retain said latching means in latching position with respect to the carrier and shiftable lengthwise with respect to said element to release the latching means to permit of the projecting of the carrier, said element and sleeve having coacting means to limit the lengthwise and circumferential shifting of said sleeve, and said sleeve having a tapered lower terminal portion formed with a flanged collar to provide bait holding means.

In testimony whereof, I affix my signature hereto.

JAMES P. DECKMAN.